US010180016B2

(12) United States Patent
Critz

(10) Patent No.: US 10,180,016 B2
(45) Date of Patent: Jan. 15, 2019

(54) LOCKABLE SECURITY RECEPTACLE FOR DELIVERED PACKAGES

(71) Applicant: John Critz, Rockingham, VA (US)

(72) Inventor: John Critz, Rockingham, VA (US)

( * ) Notice: Subject to any disclaimer, the term of this patent is extended or adjusted under 35 U.S.C. 154(b) by 0 days.

(21) Appl. No.: 15/872,982

(22) Filed: Jan. 16, 2018

(65) Prior Publication Data

US 2018/0202199 A1 Jul. 19, 2018

Related U.S. Application Data

(60) Provisional application No. 62/499,177, filed on Jan. 19, 2017.

(51) Int. Cl.

| | |
|---|---|
| ***G01W 1/00*** | (2006.01) |
| ***E05B 73/00*** | (2006.01) |
| ***B65D 55/02*** | (2006.01) |
| ***B65D 81/02*** | (2006.01) |
| ***E05B 45/00*** | (2006.01) |
| ***B65D 33/34*** | (2006.01) |
| ***B65D 33/02*** | (2006.01) |

(52) U.S. Cl.

CPC .......... *E05B 73/0023* (2013.01); *B65D 33/02* (2013.01); *B65D 33/34* (2013.01); *B65D 55/028* (2013.01); *B65D 65/44* (2013.01); *E05B 45/005* (2013.01); *E05B 73/0005* (2013.01); *B65D 2211/00* (2013.01)

(58) Field of Classification Search

CPC .................................. H01L 21/00; A61N 1/00

See application file for complete search history.

(56) References Cited

U.S. PATENT DOCUMENTS 8,358,199 B2 * 1/2013 Nesling ................ A47G 29/141 232/20

9,364,112 B2 * 6/2016 Sundaresan .......... A47G 29/124

* cited by examiner

*Primary Examiner* — Shirley Lu

(57) ABSTRACT

Disclosed is a lockable security receptacle for the safe temporary storage of delivered articles to a home or office. The receptacle comprises of a bag having single opening through which the articles can be placed, a lock to secure the articles within the bag, means to securely but removably attach the bag to the inside of the home or office door and a cable connecting the bag to the attachment means. The bag can comprise a water-resistant, ballistic grade fabric of interwoven conductive fibers for protection and security of the delivered article, and can be made with one or more alarms that are triggered if the bag is cut, if the bag is pulled or if the attachment means is pulled.

8 Claims, 6 Drawing Sheets

LOCKABLE SECURITY RECEPTACLE FOR DELIVERED PACKAGES

REFERENCE TO PRIOR APPLICATION

The present application claims priority to U.S. provisional application 62/499,177 filed on Jan. 19, 2017 and is herein incorporated by reference in its entirety.

BACKGROUND

With the rise of online ordering and ever-increasing ease of mailing parcels, there is a heightened need, more than ever before, to protect parcels delivered to the home and office. People live busier lives and thus frequently are not present when parcels arrive. Consequently, these parcels often are left outside for hours or even days at a time where they are vulnerable to damage and theft. Recipients need an efficient, reliable, protected apparatus to ensure safe delivery and storage of their parcels.

A vital feature needed in a parcel receptacle is one that allows for temporary, rather than permanent, placement of the receptacle. Recipients need to be able to install and remove the receptacle with ease, while also feeling assured of the safety of their packages. Additionally, to meet the ever-growing creativeness of thieves, multiple forms of security of the receptacle are preferred. Visual and audio alarms are in demand to ward off theft. Furthermore, as parcels sit in the receptacle, recipients need the receptacles to remain unaffected by various weather conditions.

SUMMARY

The preferred embodiment of my invention is directed to a security receptacle that satisfies the need to protect delivered packages from theft and weather between when the packages are delivered and when the recipient is able to retrieve them. The preferred embodiment of my invention contains a secure and weather resistant bag with an opening in which to place a package or packages, a cinch-close top with a lock to secure the packages inside the bag, and a cable which on one end attaches to the bag and on the other end attaches to an anchoring device that securely, but removably, secures the bag to the door of a home or office. Embodiments of our invention are adaptable to make use of a multitude of alarms to further deter and prevent theft.

BRIEF DESCRIPTION OF THE DRAWINGS

The invention will be better understood from a reading of the following detailed description taken in conjunction with the drawings in which like reference designators are used to designate like elements, and in which.

DESCRIPTION

Figure 1:
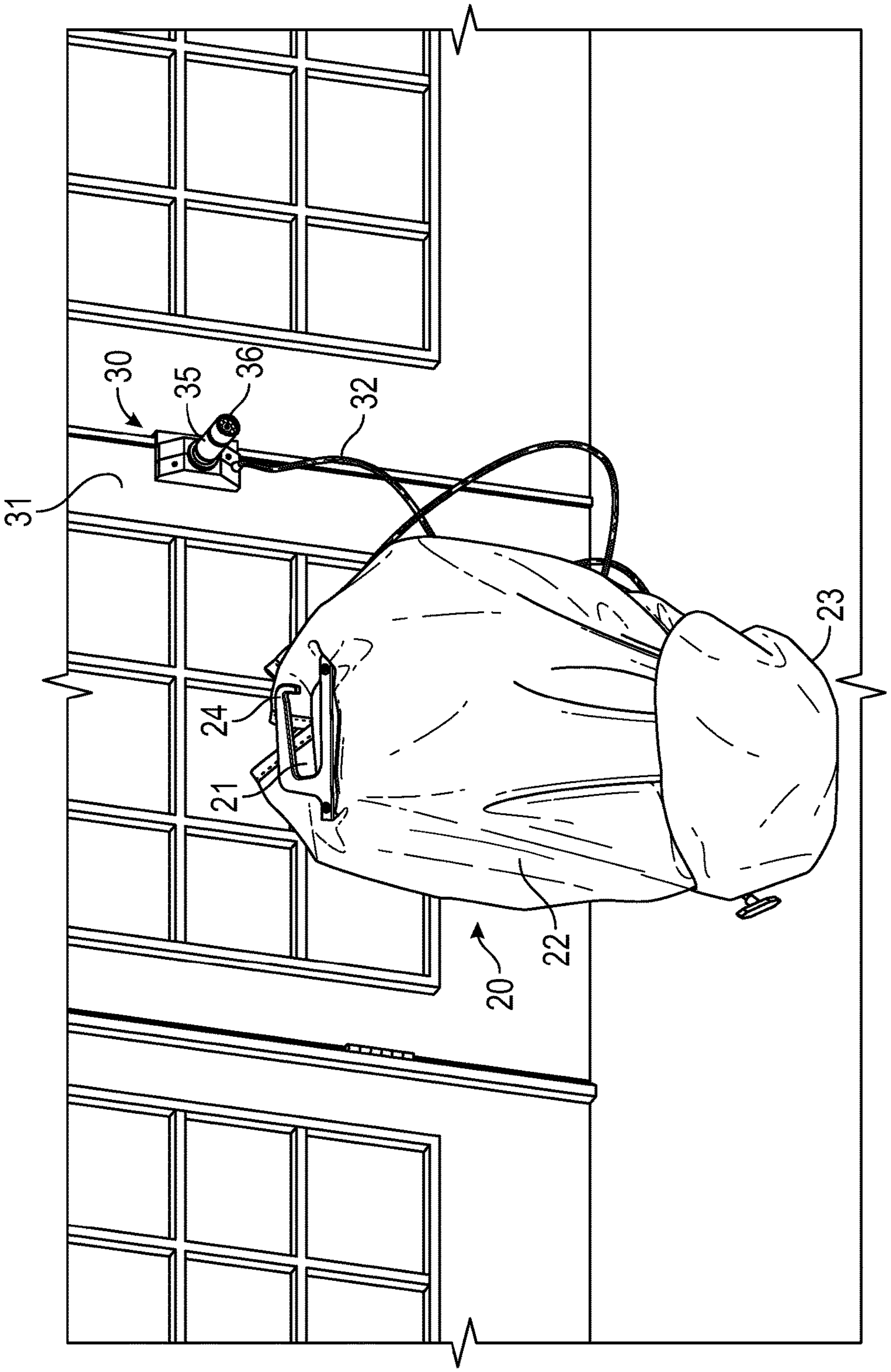
FIG. 1 illustrates a perspective view of a delivery receptacle with base as viewed attached to a door.

While my invention is susceptible to embodiments in many different forms, it is shown in the drawings and herein described in detail, features, structures, or characteristics of our invention as demonstrated in various preferred embodiments. These embodiments are to be considered for illustrative purposes and as an exemplification of the principles of our invention and are not intended to limit the broad aspects of our invention to the specific embodiments illustrated herein. The features, structures, or characteristics of our invention as disclosed in any one preferred embodiment, for example, may be rearranged or combined with the features, structures or characteristics in any other embodiment. One skilled in the relevant art will also recognize that our invention may be practiced without one or more of the specific details, or with other methods, components, materials, and so forth. In other instances, well-known structures, materials, or operations are not shown or described in detail to avoid obscuring aspects of the invention.

FIG. 1 shows a preferred embodiment of my security receptacle having a bag 20 configured to securely hold a delivered package with a top portion 21, wherein the top portion can be opened to receive packages and can be closed to secure one or more packages inside. The bag has closed sides 22, and a closed bottom 23. In this manner, the bag is configured to hold one or more delivered packages within the enclosure formed from the closed top portion 21, sides 22 and bottom 23. The bag 20 can be made of ballistic, cut-resistant fabric or any other high-strength material, including metal mesh, to protect the parcels inside from theft. The bag can also be made of weather resistant material, including ballistic fabric, to protect the delivered packages from adverse weather conditions. The bag can also be made of a laminate of multiple layers of material and, as will be explained in more detail below, can have interwoven conductive fibers therein or in one or more layers if formed as a laminate for use in triggering a built-in alarm if a thief attempts to cut the bag. The bag 20 can also have handles 24 for carrying the bag with or without packages contained therein. In the embodiment of FIG. 1 the bag 20 is attached to door 31 by an attachment device 30 consisting of a handle 35 with lights 36 at the end of the handle. The bag 20 is attached to the attachment device 30 by an attachment cable 32.

Figure 2:
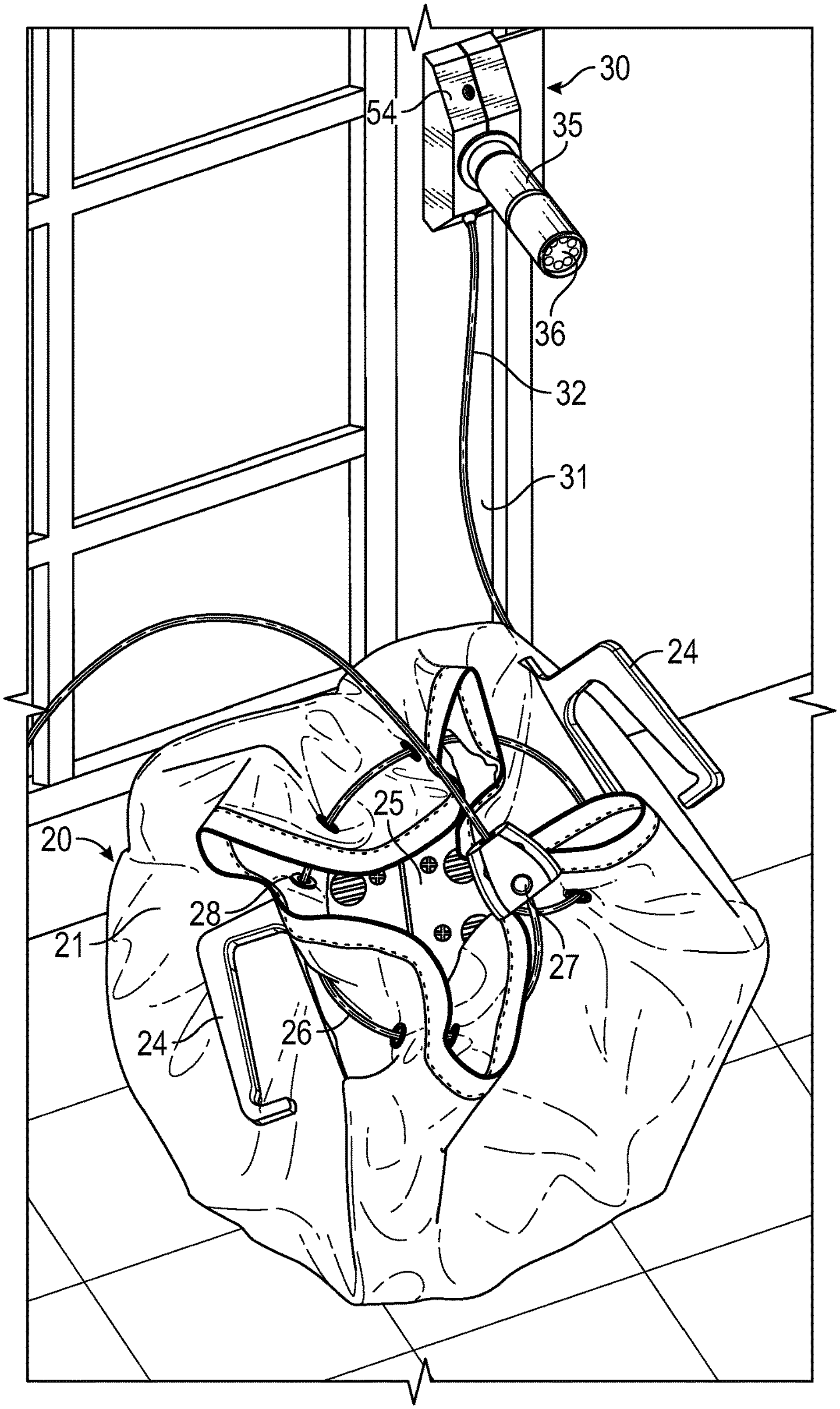
FIG. 2 illustrates an enlarged perspective view of the top of the bag and attachment device of the delivery receptacle shown in FIG. 1.

FIG. 2 shows the top portion 21 of bag 20 in a slightly open position with a package 25 located in the bag. In this embodiment, the top portion 21 is made with metal eyelets 28 through which a cinch cable 26 can be woven providing a cinch-closing top. In another embodiment, the top portion is made with a loop in the fabric within which a cinch cable is passed. In each of these embodiments the top can be closed by pulling and bundling the top material tight around the cinch cable 26, and the top portion can be securely closed and locked with a lock 27 through which the cinch cable 26 is pulled. In the embodiment shown in FIG. 2 the cinch cable and lock components are made from a Master Lock 8417D Python Adjustable Locking Cable, although other cinch cables and locks can be used. In still other embodiments, the top portion 21 can be made with a simple flap closure that is closed and secured with a locking zipper, locking turn locks, locking tuck locks, or any other locking clasps or closures. The bag 20 includes two handles 24.

Figure 3:
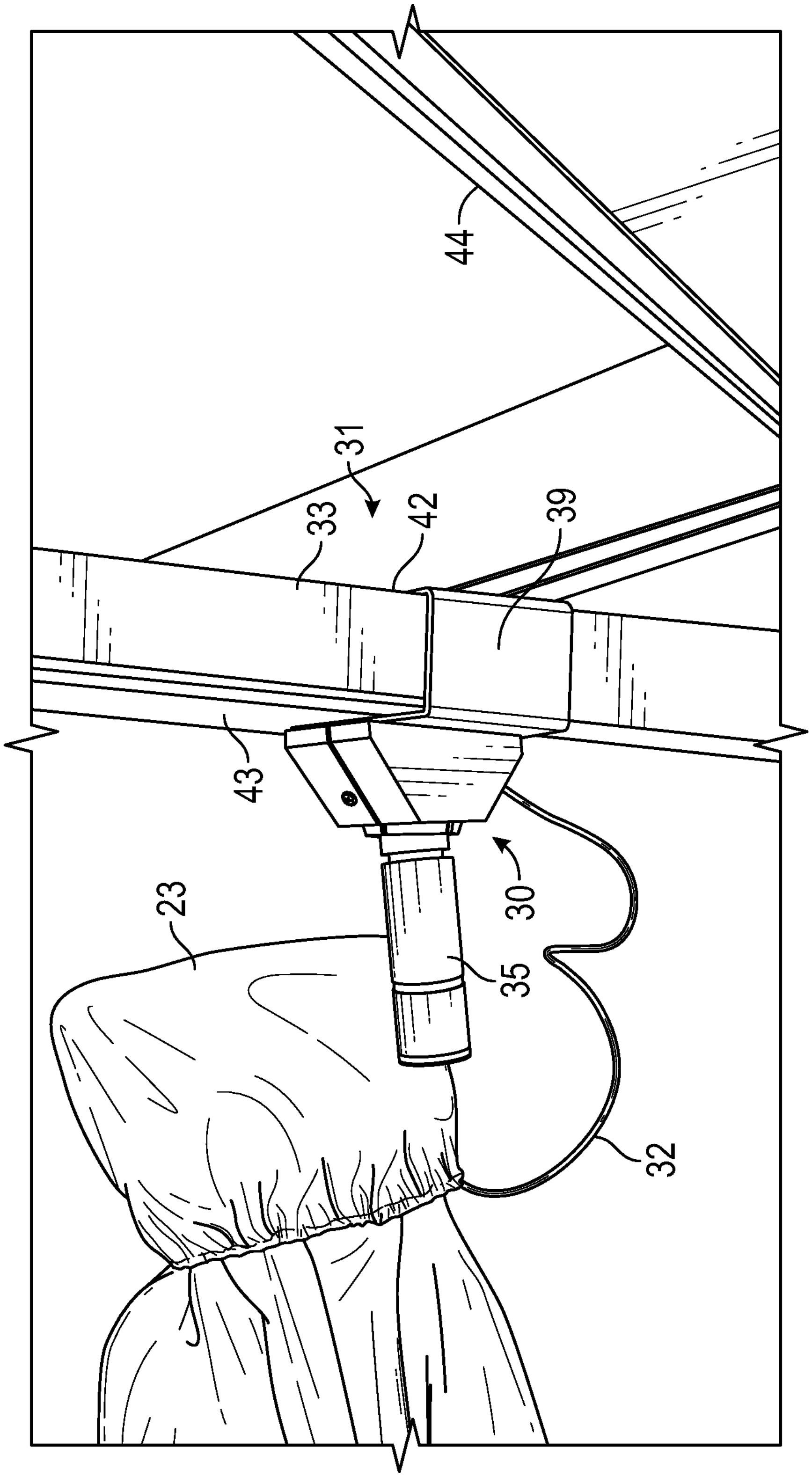
FIG. 3 illustrates a perspective view of the attachment device shown in FIGS. 1 and 2 attached to a door with the door in an open position.
Figure 4:
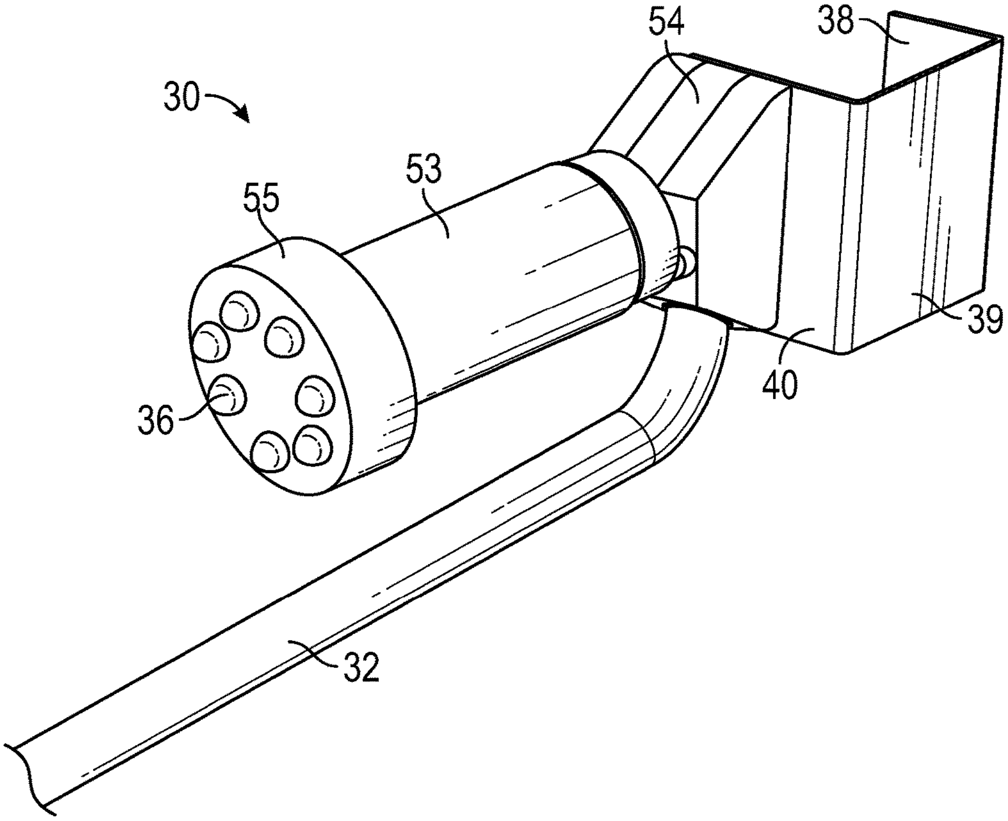
FIG. 4 illustrates a perspective view of the attachment device of the embodiments shown in FIGS. 1, 2 and 3 above.

In FIG. 1 and in FIG. 2, as well as in FIG. 4 and FIG. 4, there is shown an attachment device 30 that is configured to be securely, but removably, attached at or behind the door 31 of an office, apartment or home. In the embodiments shown in these figures the attachment device 30 attaches at an edge 33 of the door 31 and extends to the inside of the door 42 (shown in FIG. 3). The attachment device 30 has one end of an attachment cable 32 securely connected thereto, while the other end of attachment cable 32 is securely connected to a bottom compartment of the bag 20. In this manner, the bag 20 and its contents can be securely restrained and fixed at or behind the office, apartment or home door 31. The attachment device 30 also has an elongated handle 35 and, in various embodiments described herein, has electrical and mechanical components within the handle to trigger an alarm if a would-be thief were to pull at the handle 35 and/or at the attachment cable 32. As referenced above, the bag can also have interwoven fibers completing an electrical circuit such that if the bag is ripped or torn and the fibers cut, the circuit running therethrough will be cut and an alarm triggered. The cinch cable 26 can also have a conductive element running therethrough such that if the cable is cut, the circuit running therethrough will also be cut and the alarm triggered. There are also lights 36, such as LED lights, located at one end of the handle that can be set in any well-known manner to flash on and off in the event an alarm is triggered.

Figure 5:
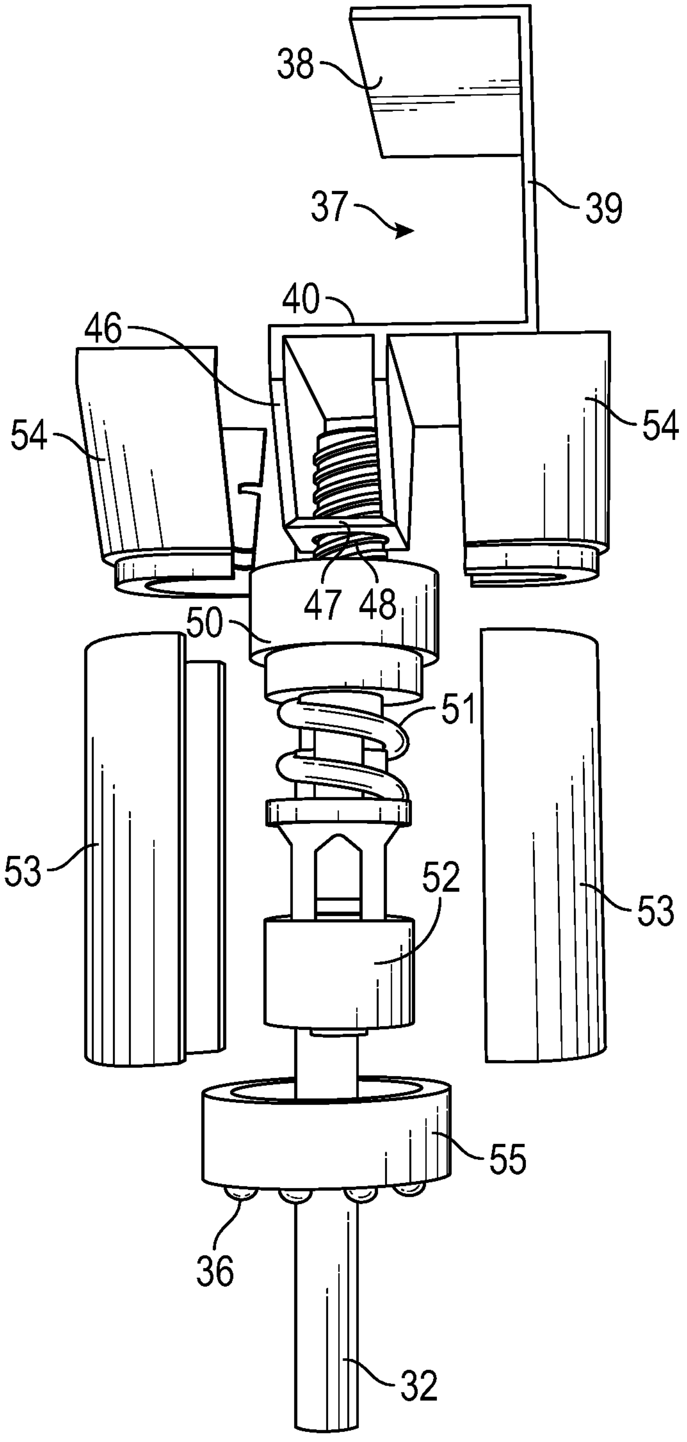
FIG. 5 illustrates a dissected view of an attachment device in one embodiment of my delivery receptacle.

FIG. 5 shows an exploded view of the components of the attachment device 30 of one embodiment of my security receptacle. There is shown a door clip 37 having a U-shaped portion with side walls 38, 39, and 40. The U-shaped portion side walls, also shown in FIG. 4, are configured to wrap around a portion of the periphery of a door, as shown in FIG. 3, with side wall 38 configured to be on the inside 42 of the door 31, side wall 39 abutting an edge 33 of the door 31, and side wall 40 configured to be on the outside 43 of the door 31. When the door is closed, the door clip 37 will thus be securely held in place with the side wall 39 secured between an edge 33 of the door and the door jamb 44 and edge 42 behind the door, thereby securely holding the entire attachment device in place. When the door is open, such as in FIG. 3, the door clip 37 can be easily removed and separated from the door 31 and the attachment device and entire security receptacle removed for storage.

Attached to the outside of side wall 40 of the U-shaped portion of the the door clip 37 is a bracket 46, to which the components of the handle 35 are secured. Bracket 46 has a hole in the outside wall 47 into which a threaded post 48 is engaged. To the outside of this hole the threaded post 48 passes through a connection ring 50 and a spring 51, and is attached to a receiving ring 52, in that preferred order. The bracket 46 is encased with a first set of handle covers 54, and the connection ring 50, spring 51 and receiving ring 52 are encased by a second set of handle covers 53 and a handle end cap 55. The connection ring 50 is attached to the inside of the second set of handle covers 53. In this manner, when the handle covers 53 are pulled by a would-be thief, this motion will pull the connection ring 50 toward the receiving ring 52, compressing the spring 51. The connection ring 50 and receiving ring 52 also have facing electrical pads or connections (not shown) attached thereto such that when the the connection ring 50 is pulled toward receiving ring 52 an electrical circuit is made between the sets of the electrical pads or connections triggering an alarm in ways well known to those skilled in the pertinent art. In an alternative embodiment, the above components can be arranged in a reverse manner such that electrical pads are separated and an electrical connection is broken in order to trigger an alarm when the attachment cable 32 or handle 35 are pulled. In the embodiment shown in FIG. 5, the end of the attachment cable 32 that attaches to the attachment device 30 extends through the center of handle endcap 55 and attaches to the connection ring 50. In this manner, when a would-be thief pulls on the attachment cable 32 it will pull on the connection ring 50 and will create the same result when the would-be thief pulls on the handle and similarly set off an alarm. In the embodiment shown in FIGS. 1-4 the end of the attachment cable 32 attached to the attachment device 30 is preferably attached to bracket 46, and no alarm is provided by pulling on the attachment cable 32. In the preferred embodiments shown in all of the figures handle endcap 55 contains a plurality of lights 36, that can also be triggered to light-up in the same manner that the alarm can be triggered and will show that the handle or attachment cable have been pulled when such alarms are provided.

Another embodiment of the attachment device is a solid block of material that is securely connected to the attachment cable and that can be placed inside the door 31 when closed, with the attachment cable lying underneath the door to anchor the bag 20 and prevent it from being removed.

Figure 6:
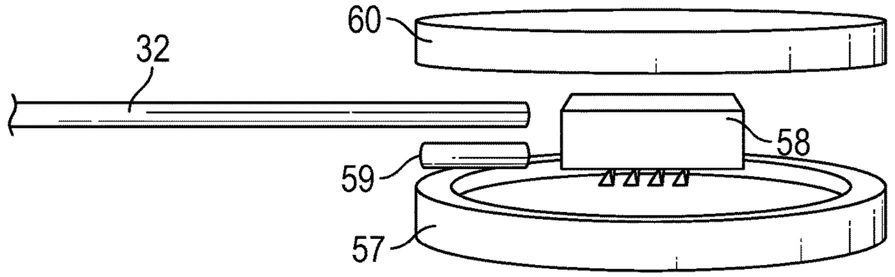
FIG. 6 illustrates a dissected view of the base in one embodiment of my delivery receptacle.

FIG. 6 shows the contents at the bottom section of the bag 20. In particular, the lowermost component within bag 20 just inside the bottom of the bag 23 is a solid base 57. Located above the base 57 is an electronics package 58 and a battery 59. The electronics package 58 contains an audio alarm (not shown) as well as electronics (not shown) connected in a manner well known to those having ordinary skill in the pertinent art to control the audio alarm and lights 36. Power to the electronics package 58 is obtained from battery 59. Securely attached through the bag side 22 and to the base 57 in any well-known manner is the attachment cable 32. The attachment cable 32 also carries conductive elements from the electronics package 58 to the handle 35, said conductive elements used to carry power to the handle 35 as well as to control alarm functions as described above. Finally, above the electronics package 58 is a false bottom 60 upon which packages can be placed within bag 20.

Figure 7:
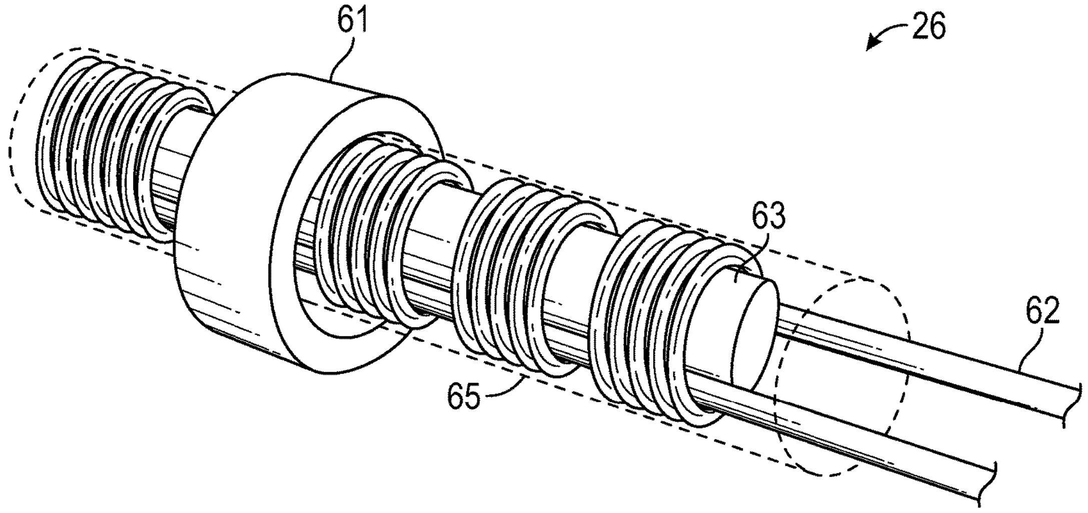
FIG. 7 illustrates an enlarged perspective and cut-away view of the cinch cable in one embodiment of my delivery receptacle.

An alternate embodiment of the cinch cable 26 is shown in FIG. 7. In particular, as shown in this Figure, within the outer skin 65 of the cinch cable 26, a conductive element 62 is wrapped around a portion of the inner cable core member 63. This core member is preferably made of steel. Around the sections of inner cable core member(s) 63 and the conductive element 62 wrapped around the core, is a magnet 61 fixed in position and held within the collar 66, shown in FIG. 8, of the lock 27 as the cinch cable 26 is pulled through. In this fashion, when the core section(s) is/are pulled passed the magnet, a fluctuation is created in the current going through the conductive element 62. This fluctuation can be sensed in a manner well known in the art and can be used to signal when the cinch cable 26 is properly locked within the lock 27.

Figure 8:
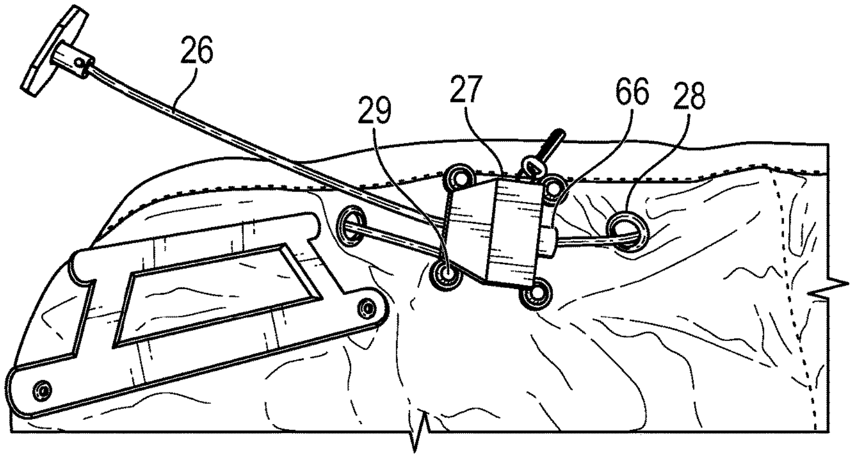
FIG. 8 illustrates a perspective view of one embodiment of the cinch cable and lock attached to my delivery receptacle.

FIG. 8 shows the cinch cable 26 threaded through metal eyelets 28 located within the top portion 21 of the bag 20. When the cinch cable 26 is pulled into the gathered/closed position, the cinch cable 26 is secured in said position by lock 27. The lock 27 is secured onto the bag 20 by four rivets 29. The cinch cable 26 passes through the fixed magnet holder 66 when it is secured in the locked position.

While the preferred embodiments of the present invention have been illustrated in detail, it should be apparent that modifications and adaptions to those embodiments may occur to one skilled in the art without departing from the scope of the present invention.

I claim:

1. A lockable security receptacle for securing delivered packages outside of a door, comprising:

a bag having closed sides, a closed bottom and an opening at the top;

locking means configured to close and lock said opening to secure a delivered package within said bag, and to unlock and open said opening to retrieve a delivered package;

attachment means configured to be removably secured inside a door;

an elongated attachment cable attached to said bag and to said attachment means;

an alarm and means for triggering said alarm;

said attachment means further comprising a. a clip configured to be removably secured around the edge of a door, b. an elongated post secured to said clip, c. a connection ring positioned around and movable along said post, d. a handle attached to said connection ring;

e. electrical contacts attached to said connection ring, f. a receiving ring within said handle positioned around said post having electrical contacts attached thereto, g. a compressible spring surrounding said post and positioned between said connection ring and said receiving ring, h. whereby said alarm configured to be triggered if said handle is pulled and the electrical contacts on said connection ring are pulled into contact with the electrical contacts on said receiver ring.

2. A lockable security receptacle according the claim 1, wherein the bag is made of a high strength material.

3. A lockable security receptacle according the claim 2, wherein the bag material comprises interwoven conductive fibers.

4. A lockable security receptacle according the claim 1, wherein the closed bottom of the receptacle comprises an enclosed compartment, said alarm located within said closed compartment, a battery located in said enclosed compartment for powering said alarm, and a charging port located in said enclosed compartment for charging said battery.

5. A lockable security receptacle for securing delivered packages outside of a door, comprising:

a bag having closed sides, a closed bottom and an opening at the top;

locking means configured to close and lock said opening to secure a delivered package within said bag, and to unlock and open said opening to retrieve a delivered package;

attachment means configured to be removably secured inside a door;

an elongated attachment cable attached to said bag and to said attachment means;

an alarm and means for triggering said alarm;

said attachment means further comprising a. a clip configured to be removably secured around the edge of a door, b. an elongated post secured to said clip, c. a connection ring positioned around and movable along said post, d. said attachment cable attached to said connection ring;

e. electrical contacts attached to said connection ring, f. a receiving ring within said handle positioned around said post having electrical contacts attached thereto, g. a compressible spring surrounding said post and positioned between said connection ring and said receiving ring;

h. whereby said alarm configured to be triggered if said attachment cable is pulled and the electrical contacts on said connection ring are pulled into contact with the electrical contacts on said receiver ring.

6. A lockable security receptacle according the claim 5, wherein the bag is made of a high strength material.

7. A lockable security receptacle according the claim 6, wherein the bag material comprises interwoven conductive fibers.

8. A lockable security receptacle according the claim 5, wherein the closed bottom of the receptacle comprises an enclosed compartment, said alarm located within said closed compartment, a battery located in said enclosed compartment for powering said alarm, and a charging port located in said enclosed compartment for charging said battery.

* * * * *